(12) United States Patent
Garcia Solares et al.

(10) Patent No.: US 9,776,386 B2
(45) Date of Patent: Oct. 3, 2017

(54) MANUFACTURING METHOD OF PARTIALLY CURED COMPOSITE COMPONENTS

(71) Applicants: Airbus Operations (SAS), Toulouse (FR); Airbus Operations S.L., Getafe (ES); Airbus S.A.S, Blagnac (FR)

(72) Inventors: Victor Garcia Solares, Getafe (ES); Pilar Munoz Lopez, Getafe (ES); Mar Zuarzo Ruiz, Getafe (ES); Betty Fantina Llorente, Getafe (ES); Cyrille Collart, Toulouse (FR); Bernard Duprieu, Blagnac (FR)

(73) Assignees: AIRBUS OPERATIONS SAS, Toulouse (FR); AIRBUS SAS, Blagnac (FR); AIRBUS OPERATIONS S.L., Getafe (ES)

( * ) Notice: Subject to any disclaimer, the term of this patent is extended or adjusted under 35 U.S.C. 154(b) by 277 days.

(21) Appl. No.: 14/570,009

(22) Filed: Dec. 15, 2014

(65) Prior Publication Data
US 2015/0165747 A1 Jun. 18, 2015

(30) Foreign Application Priority Data

Dec. 13, 2013 (EP) ..................................... 13382509

(51) Int. Cl.
*B29C 70/40* (2006.01)
*B32B 37/18* (2006.01)
*B29C 65/00* (2006.01)
*B29C 70/46* (2006.01)
*B29C 33/38* (2006.01)
(Continued)

(52) U.S. Cl.
CPC .......... *B32B 37/18* (2013.01); *B29C 33/3828* (2013.01); *B29C 35/0266* (2013.01); *B29C 65/02* (2013.01); *B29C 66/112* (2013.01); *B29C 66/131* (2013.01); *B29C 66/348* (2013.01); *B29C 66/532* (2013.01); *B29C 66/721* (2013.01); *B29C 66/73751* (2013.01); *B29C 70/46* (2013.01); *B32B 37/02* (2013.01); *B32B 37/06* (2013.01); *B32B 38/0012* (2013.01); *B32B 38/1808* (2013.01);
(Continued)

(58) Field of Classification Search
None
See application file for complete search history.

(56) References Cited

U.S. PATENT DOCUMENTS

2010/0124659 A1 5/2010 Nelson et al.

FOREIGN PATENT DOCUMENTS

JP H04 239612 8/1992

OTHER PUBLICATIONS

European Search Report, May 20, 2014.
www.quickstep.com.au.

*Primary Examiner* — Barbara J Musser
(74) *Attorney, Agent, or Firm* — Greer, Burns & Crain, Ltd.

(57) ABSTRACT

An efficient method for manufacturing a partially cured composite component intended to be joined with other component or components to form a composite structure and a manufacturing method of the composite structure. The partial curing of a composite layup is achieved using a mold comprising heat conductive elements and insulating elements and applying heat and pressure over the mold. The heat conductive elements are used to transmit or dissipate heat to/from the composite layup. The insulating elements (Continued)

are used to prevent the transmission or dissipation of heat to/from the composite layup.

9 Claims, 1 Drawing Sheet

(51) Int. Cl.
*B29C 35/02* (2006.01)
*B32B 37/02* (2006.01)
*B32B 37/06* (2006.01)
*B32B 38/18* (2006.01)
*B32B 38/00* (2006.01)
*B29C 65/02* (2006.01)
*B29L 31/30* (2006.01)
*B29D 99/00* (2010.01)

(52) U.S. Cl.
CPC ...... *B29C 66/0242* (2013.01); *B29D 99/0014* (2013.01); *B29L 2031/3076* (2013.01); *Y10T 156/1044* (2015.01)

MANUFACTURING METHOD OF PARTIALLY CURED COMPOSITE COMPONENTS

CROSS-REFERENCES TO RELATED APPLICATIONS

This application claims the benefit of the European patent application No. 13382509.1 filed on Dec. 13, 2013, the entire disclosures of which are incorporated herein by way of reference.

FIELD OF THE INVENTION

This invention relates to methods of manufacturing partially cured composite components and also to methods of manufacturing composite structures using partially cured composite components.

BACKGROUND OF THE INVENTION

Composites are made up from individual laminas bonded together at a certain temperature in a single consolidated laminate. Each layer is composed of a mixture of fibers and resin. The resin flows within and between the laminas before getting to its curing temperature.

Composite laminates are used extensively in the aeronautical industry as well as in other industries.

In conventional manufacturing processes, the components of a composite structure are manufactured independently and subsequently joined or assembled to reach the final structure.

Three types of techniques are available to get a final composite structure without using rivets as joining elements of its components: co-curing un-cured components, co-bonding cured components with un-cured components and bonding cured components between them (secondary bonding).

The co-curing technique is the best from a structural point of view but requires a complicate tooling for handling the assembly of un-cured components.

A known approach to solve this problem is using partially cured composite components because they can be better handled than fully un-cured components. In a known method to produce panels with two curing areas a composite layup is placed in a two chamber mold between four semi-rigid membranes and then, while vacuum is applied to the layup, temperature and pressure is exerted to the layup by fluids introduced into the chambers (see the Australian Quickstep website for further information).

A disadvantage of that method for, particularly, manufacturing partially cured large composite components is the complexity and cost of the tooling required.

The present invention is directed to the solution of said drawback.

SUMMARY OF THE INVENTION

An object of the present invention is to provide an efficient method for manufacturing a partially cured composite component intended to be joined with other component or components to form a composite structure.

Another object of the present invention is to provide a method for manufacturing a composite structure with partially cured components manufactured by the above method.

The method of manufacturing a partially cured composite component according to the invention comprises:

placing a composite layup inside a mold comprising heat conductive and insulating elements, the heat conductive elements being placed to transmit heat to those portions of the composite layup that shall be fully cured or to dissipate heat from those portions of the composite layup that be shall be partially cured or remain un-cured, the heat insulating elements being placed to prevent the transmission of heat to those portions of the composite layup that shall be partially cured or remain un-cured or to prevent the dissipation of heat from those portions of the composite layup that shall be fully cured;

applying heat and pressure to the mold.

A suitable combination of heat conductive and insulating elements taking into account the geometry of the composite component being manufactured and the desired curing degree of different portions of the same allows the application of a predetermined cycle of pressure and heat to the mold to achieve the desired result. In particular, the dimension of the transition portions between the cured and un-cured portions can be properly controlled.

Advantageously, the heat conductive and insulating elements are rigid elements. This facilitates the preparation of the mold and the control of the transmission of heat to the different portions of the composite layup.

Advantageously, pressure is applied on two opposite faces of the mold by mechanical pressure elements such as pressure plates. The aforementioned mold structure allows configuring the mold with two opposite faces adapted to the shape of the pressure elements being used.

Advantageously, heat is applied to the mold in one direction, for example by applying it on one side of the mold. This simplifies the tooling required. Depending on the component being manufactured, heat can be applied to the whole mold or only to an element of the mold.

The method of manufacturing a composite structure according to the invention comprises:

preparing a first composite lay-up and one or more second composite layups;

curing partially said one or more second composite layups according to the aforementioned method, leaving un-cured those portions intended to be joined to the first composite layup;

assembling said layups bringing in contact said un-cured portions of said one or more second composite layups with the first layup;

co-curing the assembled set of said layups.

This method is particularly applicable for the manufacture of, for example, skins of aircraft lifting surfaces reinforced with T-shaped or omega-shaped stringers, being the first layup the skin layup, the second layups the stringer layups and the un-cured portions of the stringers their feet and a portion of their webs.

Other characteristics and advantages of the present invention will be clear from the following detailed description of embodiments illustrative of its object in relation to the attached figures.

DETAILED DESCRIPTION OF THE PREFERRED EMBODIMENTS

Figure 1:
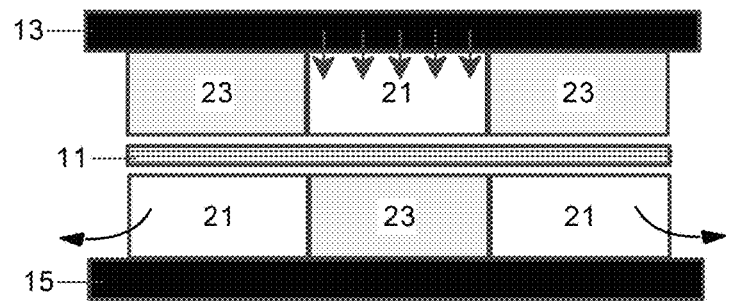
FIG. 1 is a schematic cross section illustrating an embodiment of the invention for the manufacture of a flat panel partially cured showing the panel lay-up and the tooling arrangement for performing the curing operation.

In relation to the curing degree of a portion of a composite component, in this specification an un-cured portion shall be understood as a portion with a curing degree lower than 20%, a cured portion as a portion with a curing degree higher than 80% and a partially cured portion as a portion with a curing degree between 20-80%.

In reference to FIG. 1, an embodiment of the method of the invention for manufacturing a composite flat panel with a central portion cured and two side portions partially cured will now be described.

In a first step, a composite layup 11 is disposed in a mold formed by steel boxes 21 and mica plates 23.

In a second step, heat and pressure are applied on the mold using a heated upper pressure plate 13 and a lower pressure plate 15.

Steel boxes 21, used as heat conductive elements, and mica plates 23, used as heat insulating elements, are arranged so that the heat comes from the heated upper pressure plate 13 to the central portion of the layup 11 through the upper steel box 21 as shown by the straight arrows of FIG. 1 to carry out curing. Heat is also transmitted through the layup 11 to its side portions, but part of that heat is dissipated (arrows D) through the lower steel boxes 21.

This arrangement allows controlling the application of heat to the layup 11 so that its central portion, disposed between the upper steel box 21 and the lower mica plate 23, is cured and the side portions, disposed between the upper mica plates 23 and the lower steel boxes 21, remain un-cured except in some portions close to the central portion where they are partially cured.

In reference to FIG. 2, an embodiment of the method of the invention for manufacturing a T-shaped stringer with a portion of the web cured, with the foot and a portion of the web un-cured and with an intermediate portion of the web partially cured, will now be described.

In a first step, a T-shaped composite layup 11 is disposed in a mold formed by steel boxes 21 and mica plates 23 with the web in the lower part and the foot in the upper part.

In a second step, heat and pressure are applied on the mold using the heated lower pressure plate 13 and the upper pressure plate 15.

Figure 2:
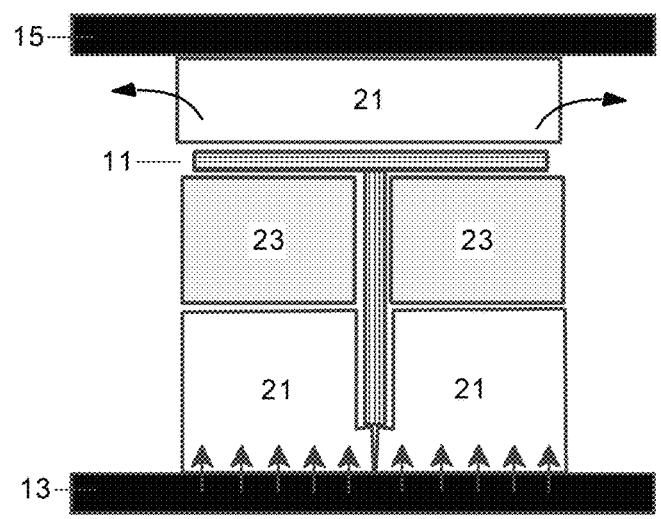
FIG. 2 is a schematic cross section illustrating an embodiment of the invention for the manufacture of a T-shaped stringer showing the stringer lay-up and the tooling arrangement for performing the curing operation.

Steel boxes 21, used as heat conductive elements, and mica plates 23, used as heat insulating elements, are arranged so that the heat comes from the heated lower pressure plate 13 to a first portion of the web of the layup 11 through the lower steel boxes 21, as indicated by the straight arrows in FIG. 2, to carry out curing. Heat is also transmitted through the layup 11 to the rest of the web and to the foot. In the remainder of the web, the mica plates 23 prevent heat from dissipating so that it can be partially cured. The foot remains un-cured because the upper steel box 21 allows the dissipation of the heat (arrows D) that arrives to the foot of the layup 11.

In reference to FIG. 3, an embodiment of the method of the invention for manufacturing an omega-shaped stringer with the head and a portion of the webs cured, with the feet and a portion of the webs un-cured and with an intermediate portion of the webs partially cured, will now be described.

In a first step, an omega-shaped composite layup 11 is disposed in a mold formed by a steel box 22, equipped with heating elements for acting as a self-heated module, steel boxes 21, used as heat conductive elements, and mica plates 23, used as heat insulating elements.

In a second step, pressure is applied on the mold by means of two pressure plates 15 and the self-heated module 22 is activated for the application of heat.

Figure 3:
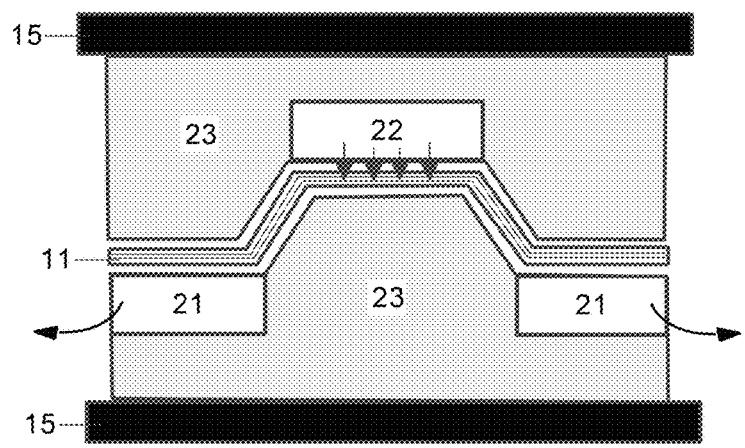
FIG. 3 is a schematic cross section illustrating an embodiment of the invention for the manufacture of an omega-shaped stringer showing the stringer lay-up and the tooling arrangement for performing the curing operation.

The self-heated module 22 and the mica plates 23 are arranged so that heat reaches the head of the omega-shaped layup 11 as indicated by the straight arrows in FIG. 3 to carry out curing. Heat is also transmitted through the webs of the layup 11. Mica plates 23 prevent heat dissipation so that the webs of the layup 11 can be partially cured. The lower steel boxes 21 allow the dissipation of heat (arrows D) arriving at the feet of the layup 11 so that they remain un-cured.

Method of manufacturing of a structure with composite components partially cured In an embodiment to manufacture, for example, a skin reinforced with T-shaped stringers of an aircraft lifting surface, the method of the invention comprises:

Preparing the composite layup corresponding to the skin and the composite layups corresponding to the T-shaped stringers.

Partially curing the composite layups corresponding to the T-shaped stringers according to the method explained above in reference to FIG. 2. Its execution out-of-autoclave optimizes energy consumption.

Assembling the un-cured skin layup and the partially cured T-shaped stringer layups bringing in contact the feet (un-cured) of the stringers layups with the skin layup (un-cured) using appropriate tooling. The tooling required for this assembly is less complex than the tooling required for the assembly of fully un-cured components because the stringers can be moved handling them by the cured portion of their webs and can be easily positioned over the skin layup using suitable positioners.

Co-curing the assembled set of said layups in, for example, an autoclave.

Although the present invention has been described in connection with various embodiments, it will be appreciated from the specification that various combinations of elements, variations or improvements therein may be made, and are within the scope of the invention.

The invention claimed is:

1. A method of manufacturing a partially cured composite component, the method comprising:
    placing a composite layup inside a mold, the composite layup having a first side opposite a second side;
    providing a source of pressure configured to apply pressure in a direction towards the first side of the composite layup;
    providing a source of pressure configured to apply pressure in a direction towards the second side of the composite layup;
    applying heat and pressure to the mold;
       wherein the mold comprises a plurality of heat conductive elements and a plurality of insulating elements;
    placing the heat conductive elements between the source of pressure configured to apply pressure in a direction towards the first side of the composite layup and the first side of the composite layup to transmit heat to those portions of the composite layup that shall be fully cured; and placing the insulating elements between the source of pressure configured to apply pressure in a direction towards the first side of the composite layup and the source of pressure configured to apply pressure in a direction towards the second side of the composite layup to prevent the transmission of heat to those portions of the composite layup that shall remain un-cured and to prevent the dissipation of heat from those portions of the composite layup that shall be fully cured.

2. A method according to claim 1, wherein the heat conductive elements and the insulating elements comprise rigid elements.

3. A method according to claim 2, wherein the pressure is applied over two opposing faces of the mold.

4. A method according to claim 3, wherein heat is applied over one of the faces of the mold where pressure is applied.

5. A method according to claim 2, wherein the pressure is applied over two opposing faces of the mold and the heat is applied directly from heat conductive elements of the mold provided with heating elements.

6. A method according to claim 2, wherein the heat conductive elements comprise steel boxes and the heat insulating elements comprise mica plates.

7. A method of manufacturing a composite structure, comprising:

preparing a first composite layup and one or more second composite layups;

curing partially said one or more second composite layups according to the method of claim 1 leaving un-cured those portions intended to be joined to the first composite layup;

assembling said first and second composite layups bringing in contact the un-cured portions of the one or more second composite layups with the first composite layup; and co-curing the assembled set of said layups.

8. A method of manufacturing a composite structure according to claim 7, wherein:

the composite structure comprises a reinforced skin of an aircraft lifting surface, the first composite layup is the skin layup and the second composite layups are T-shaped or omega-shaped stringers layups;

the un-cured portions of the stringer layups intended to be joined to the skin layup comprise feet and a contiguous portion of webs of the stringer layups;

a portion of the stringer layups farthest from the skin layup is cured;

an intermediate web portion of the stringer layups is partially cured.

9. A method according to claim 1, wherein at least one heat insulating element is separated from at least one heat conductive element by the composite layup, the at least one heat insulating element positioned opposite the at least one heat conductive element.

* * * * *